(12) United States Patent
Jürs et al.

(10) Patent No.: US 8,814,637 B2
(45) Date of Patent: Aug. 26, 2014

(54) APPARATUS AND METHOD FOR FILLETING BEHEADED AND EVISCERATED FISH

(75) Inventors: Michael Jürs, Haffkrug (DE); Matthias Schroeder, Badendorf (DE)

(73) Assignee: Nordischer Maschinenbau Rud. Baader GmbH + Go., KG (DE)

( * ) Notice: Subject to any disclaimer, the term of this patent is extended or adjusted under 35 U.S.C. 154(b) by 0 days.

(21) Appl. No.: 13/698,028

(22) PCT Filed: May 24, 2011

(86) PCT No.: PCT/EP2011/058430
§ 371 (c)(1),
(2), (4) Date: Nov. 14, 2012

(87) PCT Pub. No.: WO2011/151220
PCT Pub. Date: Dec. 8, 2011

(65) Prior Publication Data
US 2013/0059514 A1  Mar. 7, 2013

(30) Foreign Application Priority Data

May 31, 2010  (DE) .......................... 10 2010 022 055

(51) Int. Cl.
*A22C 25/16* (2006.01)
(52) U.S. Cl.
USPC ........................................................ 452/162
(58) Field of Classification Search
USPC .................. 455/149–153, 160–162, 165, 170
See application file for complete search history.

(56) References Cited

U.S. PATENT DOCUMENTS

| 3,570,048 | A |   | 3/1971  | Johannes |         |
|-----------|---|---|---------|----------|---------|
| 3,964,132 | A | * | 6/1976  | Backhaus et al. | 452/162 |
| 4,236,275 | A | * | 12/1980 | Westerdahl | 452/135 |
| 4,748,723 | A | * | 6/1988  | Braeger et al. | 452/122 |

(Continued)

FOREIGN PATENT DOCUMENTS

| CN | 2772701 Y   | 4/2006 |
| DE | 19817840 A1 | 1/1999 |

(Continued)

OTHER PUBLICATIONS

English Translation of Office Action dated May 31, 2010 from German Patent Application No. 102010022055.8 filed May 31, 2010 (2 pages).

(Continued)

*Primary Examiner* — Richard Price, Jr.
(74) *Attorney, Agent, or Firm* — Schmeiser, Olsen & Watts LLP

(57) ABSTRACT

The invention relates to an apparatus for filleting decapitated and gutted fish, comprising a cutting unit for filleting the fish, wherein the cutting unit has at least one pair of circular blades, and an endlessly rotating transport conveyor with at least one saddle-shaped supporting body for receiving the fish and conveying them in the direction of transport T through the cutting unit tail first, which is distinguished in that the two circular blades of a pair of circular blades are driven in opposite directions. Furthermore the invention relates to a corresponding method.

7 Claims, 1 Drawing Sheet

(56) References Cited

U.S. PATENT DOCUMENTS

| | | | |
|---|---|---|---|
| 5,536,205 A * | 7/1996 | Braeger et al. | 452/161 |
| 5,871,395 A * | 2/1999 | Grabau et al. | 452/162 |
| 6,200,211 B1 * | 3/2001 | Braeger et al. | 452/162 |
| 7,090,574 B2 | 8/2006 | Braeger et al. | |
| 2010/0255767 A1 | 10/2010 | Jürs et al. | |
| 2011/0111681 A1 | 5/2011 | Jü et al. | |
| 2012/0149290 A1 | 6/2012 | Jürs et al. | |
| 2013/0035023 A1 | 2/2013 | Jürs | |

FOREIGN PATENT DOCUMENTS

| | | |
|---|---|---|
| DE | 102007053904 B3 | 1/2009 |
| DE | 102007053905 B3 | 1/2009 |
| GB | 1046960 | 10/1966 |
| JP | H0638671 A | 2/1994 |
| JP | 2004261010 A | 9/2004 |
| KR | 200430829 | 11/2006 |
| KR | 200430830 | 11/2006 |

OTHER PUBLICATIONS

Office Action dated Mar. 7, 2011 from German Patent Application No. 102010022055.8 filed May 31, 2010 (5 pages).

International Preliminary Report on Patentability and Written Opinion dated Dec. 4, 2012 from International Patent Application No. PCT/EP2011/058430 filed May 24, 2011 (12 pages).

International Search Report and Written Opinion dated Sep. 14, 2011 from International Patent Application No. PCT/EP2011058430 filed May 24, 2011 (9 pages).

Office Action dated May 31, 2010 from German Patent Application No. 102010022055.8 filed May 31, 2010 (3 pages).

Office Action dated Dec. 10, 2013 for Japanese Patent Application No. 2013-509579 by the Japanese Patent Office (3 pages).

Examination Report dated Nov. 28, 2013 from Chilean Patent Application CL 03179-2012 by the Chilean Patent Office (14 pages).

Office Action dated Mar. 27, 2014 for Chinese Patent Application No. 201180025255.8 by the Chinese Patent Office. 12 pages.

* cited by examiner

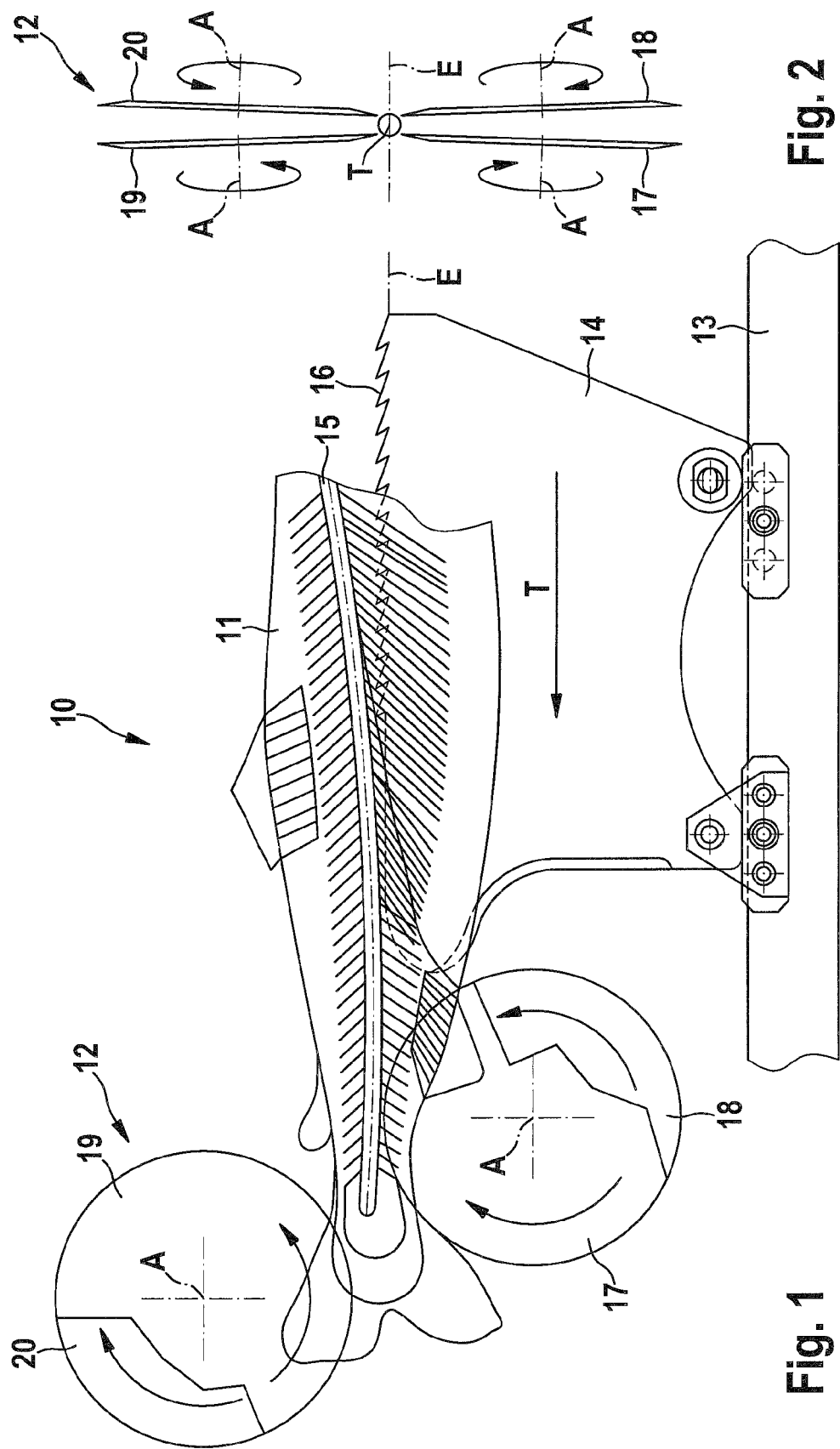

APPARATUS AND METHOD FOR FILLETING BEHEADED AND EVISCERATED FISH

The invention relates to an apparatus for filleting decapitated and gutted fish, comprising a cutting unit for filleting the fish, wherein the cutting unit has at least one pair of circular blades, and an endlessly rotating transport conveyor with at least one saddle-shaped supporting body for receiving the fish and conveying them in the direction of transport T through the cutting unit tail first.

Furthermore the invention relates to a method for filleting decapitated and gutted fish, with the steps of: transporting a fish resting with its backbone on a supporting body with its back at the top, tail first through an apparatus for filleting fish, wherein during transport the ventral belly bones and/or the dorsal back bones are cut free by means of a pair of circular blades.

Such apparatuses and methods are used in the fish-processing industry to separate the fillets from the skeleton of the fish. To be more precise, the ventral belly spokes and the dorsal back spokes are cut free. In the process, two circular blades each forming a pair engage the fish from above for the dorsal cuts, and from below for the ventral cuts. The circular blades are rotated about an axis, wherein the axes run transversely to the direction of transport T. For cutting free, the fish is transported in the direction of transport T through the pairs of circular blades, wherein the fish or the backbone (vertebral column) of the fish, which usually rests on a supporting edge of the supporting body, defines the plane of transport E. The two circular blades for the dorsal cuts lie above the plane of transport, and the two circular blades for the ventral cuts lie below the plane of transport. The two circular blades of a pair are spaced apart from each other to enable transport of the fish through or between the circular blades. In other words, the two circular blades of a pair run on the left and right adjacent to the backbone or adjacent to the spokes protruding from the backbone.

In practice, it is usual for the circular blades of a pair to rotate in their direction of movement with the direction of transport T. This means that the circular blades in contact with the fish pull it in the direction of transport T. The direction of movement of the circular blades is therefore always referred to the position or moment in which the circular blades encounter the fish for cutting. The direction of rotation and direction of movement are therefore not necessarily the same. The direction of rotation is referred to the driving axis. The direction of movement is, as mentioned, referred to the circular blades encountering the fish. The two circular blades of a pair are driven in the same direction in previous practice. As a result of this principle of the circular blades running together in the same direction, the cutting forces cut open the body of the fish and therefore the flesh with parallel direction. In the process, force vectors seen from the cutting edge of the blade have a deflecting effect. To compensate for these outwardly acting forces, external forces must be applied to push the flesh to be separated back into the region of the circular blades. However, these external forces cause the body of the fish lying on the supporting body, from which the fillets are to be separated, to be accelerated in the direction of transport T. To prevent the body of the fish from being pulled off the supporting body, additional holding elements are necessary. To keep the position of the body of the fish on the supporting body, e.g. so-called fangs are therefore provided on the supporting edge of the supporting body. However, the forces mentioned can, in spite of the above measures, lead to incorrect positioning of the bodies of the fish on the supporting body, so that the subsequent cuts cannot be performed optimally.

It is therefore the object of the invention to provide a structurally simple apparatus which ensures an improved cutting result. It is further the object of the invention to propose a corresponding method.

This object is firstly achieved by an apparatus having the features mentioned hereinbefore by the fact that the two circular blades of a pair are driven in opposite directions. As a result, the cutting forces cancel each other out. To be more precise, the cutting blade which is driven in the direction of transport T, that is, also runs in the direction of transport T, causes the cutting force or a component thereof to act outwardly, deflecting away from the cutting edge of the blade. This prevents the backbone or bone structure or tail fin from being drawn in by the circular blade. The circular blade which is driven in the opposite direction causes the cutting force or a component thereof to act in the direction of the cutting edge of the blade, that is, drawing in flesh. The result obtained is an equilibrium of forces which, without additional holding elements or the like, leads to a stable position of the body of the fish on the supporting body.

An appropriate development of the invention is distinguished in that the cutting unit comprises a first, lower pair of circular blades for cutting free the ventral belly bones, and a second, upper pair of circular blades for cutting free the dorsal back bones, wherein the two circular blades of each pair are driven in opposite directions. Due to the fact that an equilibrium of forces is produced both above and below the plane of transport, the position of the body of the fish on the supporting body is stabilised.

Advantageously, the left circular blade of the lower pair of circular blades in the direction of transport T has the same direction of rotation as the right circular blade of the upper pair of circular blades in the direction of transport T. Due to this cross-over arrangement of circular blades driven in the same direction, further improved positioning of the body of the fish is achieved. In other words, diagonally opposed circular blades of different pairs of circular blades have the same direction of rotation, so that the body of the fish is fixed in the optimum position by the cutting forces or components thereof, as it were, on the supporting body. Due to the same direction of rotation of the diagonally opposed circular blades on the one hand and the arrangement of one circular blade above the plane of transport E and the other circular blade below the plane of transport E on the other hand, the two diagonally opposed circular blades have a different direction of movement referred to the fish.

Secondly, the object is achieved by a method having the steps mentioned hereinbefore by the fact that the circular blades of a pair rotate in different directions during cutting. The resulting advantages have already been described in connection with the apparatus, on account of which reference is made to the corresponding passages to avoid repetition.

Further appropriate and/or advantageous features and developments of the invention are apparent from the subsidiary claims and the description. A particularly preferred embodiment of the invention as well as the principle of the method according to the invention are described in more detail with the aid of the attached drawings. The drawings show:

FIG. 1 a schematic side view of essential components, namely in particular the cutting unit and a body of a fish arranged on the supporting body, of the filleting apparatus, and FIG. 2 the arrangement of circular blades in a front view.

The apparatus shown in the drawings is used for filleting decapitated and gutted fish.

The apparatus 10 for filleting decapitated and gutted fish 11 comprises in the usual manner a cutting unit 12 and an endlessly rotating transport conveyor 13 with at least one supporting body 14. The fish 11 or the body of the fish lies with its backbone 15 on a supporting edge 16 of the supporting body 14. The fish 11 is conveyed tail first with its back at the top in the direction of transport T through the apparatus 10. In the process, the fish 11 or its backbone 15 or, to be more precise, the supporting edge 16 of the supporting body 14 defines the plane of transport E.

The cutting unit 12 for filleting the fish 11 has at least one pair of circular blades 17, 18. The pair of rotatable circular blades 17, 18 is constructed and designed in a known manner, depending on the arrangement relative to the transport conveyor 13, to cut free the dorsal back spokes or bones or ventral belly spokes or bones. Preferably the cutting unit 12 comprises a second pair of circular blades 19, 20 which is constructed and designed to match the first pair of circular blades 17, 18. One pair of circular blades 17, 18 is then arranged below the plane of transport E for cutting free the ventral belly bones. The other pair of circular blades 19, 20 is arranged above the plane of transport E for cutting free the dorsal back bones. The two pairs of circular blades 17, 18; 19, 20 can be offset from each other in the direction of transport T or arranged directly one above the other.

The endlessly rotating transport conveyor 13 preferably comprises several supporting bodies 14. These saddle-shaped supporting bodies 14, which are also referred to as transport saddles, are arranged stationarily but releasably on the transport conveyor 13 and rotate with it. The supporting bodies 14 are constructed and designed to receive the fish 11. By means of the supporting body 14, the fish 11 lying on it can be conveyed tail first in the direction of transport T through the cutting unit 12.

The two circular blades 17, 18 or 19, 20 of each pair of circular blades are driven in opposite directions. In other words, the two circular blades 17, 18; 19, 20 of each pair of circular blades have different directions of rotation. The left circular blade 17 of the lower pair of circular blades 17, 18 in the direction of transport T is driven e.g. in the opposite direction to the direction of transport T, while the right circular blade 18 of the lower pair of circular blades 17, 18 is driven in the direction of transport T. Thus the circular blade 17 exerts a decelerating/retarding effect on the fish 11, while the circular blade 18 exerts an accelerating effect on the fish 11. As a result, these forces cancel each other out. Naturally the directions of rotation of the circular blades 17, 18 and therefore the direction of movement referred to the fish 11 can also be exchanged.

The second, upper pair of circular blades 19, 20 is also driven correspondingly to the first, lower pair of circular blades 17, 18, namely also in opposite directions to each other. The direction of rotation of the circular blades 17, 18 on the one hand and of the circular blades 19, 20 on the other hand can vary. The preferred variant is one in which the left circular blade 17 of the lower pair of circular blades 17, 18 in the direction of transport T has the same direction of rotation as the right circular blade 20 of the upper pair of circular blades 19, 20 in the direction of transport T. Due to the fact that the circular blade 17 engages the fish 11 from below, the cutting force or a component thereof acts in the direction opposite the direction of transport T. The circular blade 20 engages the fish 11 from above, so that the cutting force or a component thereof acts in the direction of transport T. In this embodiment the two circular blades 18, 19 are driven correspondingly, that is, with the same direction of rotation but different direction of movement. As a result the two circular blades 17, 19 located on the left in the direction of transport T with respect to the direction of movement are driven in the direction opposite the direction of transport T, while the two circular blades 18, 20 located on the right with respect to the direction of movement are driven in the direction of transport T. The directions of driving of the circular blades 17 to 20 can, however, also be selected exactly in reverse.

The driving speeds of the circular blades 17 to 20 are preferably selected the same. However, there is the possibility of selecting the driving speed of the lower circular blades 17, 18 differently to the driving speed of the upper circular blades 19, 20. There is also the possibility of varying the driving speeds of the pairs of circular blades 17, 18; 19, 20 from each other, so that all of the circular blades 17 to 20 are driven at different speeds.

As mentioned above, the axes A of the circular blades 17 to 20 run transversely to the direction of transport T. In a first embodiment the axes A can be at a right angle to the direction of transport T, so that the spaced-apart circular blades 17, 18; 19, 20 of a pair run parallel to each other. The preferred arrangement of the circular blades 17, 18; 19, 20 of a pair is, however, such that the circular blades 17, 18 of the lower pair are arranged at an angle to each other. The angle between the two circular blades 17, 18 is selected such that the distance between the circular blades 17, 18 is shorter on the side facing towards the fish 11 than on the side facing away from the fish 11. As a result, the shortest distance between the circular blades 17, 18 is in the region which enters the fish 11—as close as possible to the backbone 15—for filleting. The circular blades 19, 20 of the upper pair are arranged correspondingly, namely such that the distance is shorter on the side facing towards the fish 11 than on the side facing away from the fish 11.

Further possible components of the apparatus, 10 for example a device for centring the fish 11 or the like, as well as common designs such as e.g. pivoting of the individual circular blades etc., are not shown explicitly.

Below, the principle of the method is described in more detail with the aid of the drawings. An operator lays the decapitated and gutted fish 11 with the open ventral cavity at the bottom on the supporting body 14, so that the fish 11 then points tail first in the direction of transport T. The fish 11 lies with its backbone 15 or vertebral column on the supporting edge 16 of the supporting body 14. The fish 11 or the body of the fish is then transported by means of the supporting body 14 through the cutting apparatus 12.

First the circular blades 17, 18 separate the ventral fillets from the skeleton (cutting free of the ventral belly bones), by the fact that the supporting body 14 is transported through between the circular blades 17, 18. During cutting of the ventral fillets, the circular blades 17, 18 rotate with different directions of rotation, so that one circular blade 17 acts on the fish 11 with a force component in the direction opposite the direction of transport T, while the other circular blade 18 acts on the fish 11 with a force component in the direction of transport T. In other words, the circular blade 18 rotating in the same direction causes the backbone 15 of the fish 11 not to be drawn in by the pair of circular blades 17, 18. The circular blade 17 rotating in the opposite direction causes cutting into the backbone 15 or the tail fin to a point below the backbone 15. As a result the backbone 15 is held in the central position on the supporting body 14, which improves guiding of the ventral cuts, but also of the subsequent cuts. After cutting free of the ventral belly bones, the fish 11 is transported on the supporting body 14 through between the circular blades 19, 20. During cutting of the dorsal fillets, the circular blades 19, 20 likewise rotate with different directions of rotation, so that one circular blade 19 acts on the fish 11 with a force component in the direction opposite the direction of transport T, while the other circular blade 20 acts on the fish 11 with a force component in the direction of transport T.

The circular blades 17 to 20 can all be driven at the same driving speed. Optionally, the driving speed can also differ from one circular blade to another. Another variant provides that the circular blades 17, 18 or 19, 20 of a pair have the same speed, but the speed of the pairs differs from each other.

The circular blades 17 to 20 can enter the fish perpendicularly, that is, at a right angle to the direction of transport T or to the plane of transport E. Alternatively, the circular blades 17 to 20 can also enter the fish 11 at an angle of less than or more than 90° referred to the plane of transport E. The ventral belly bones and the dorsal back bones can also be cut free in parallel, that is, simultaneously.

The invention claimed is:

1. Apparatus for filleting decapitated and gutted fish, comprising a cutting unit for filleting the fish, wherein the cutting unit has at least one pair of circular blades, and an endlessly rotating transport convey or with at least one saddle-shaped supporting body for receiving the fish and conveying them in the direction of transport T through the cutting unit tail first, characterised in that two circular blades of the at least one pair of circular blades are driven in opposite directions, characterised in that the cutting unit comprises a first, lower pair of circular blades for cutting free the ventral belly bones, and a second, upper pair of circular blades for cutting free the dorsal back bones, wherein the two circular blades of each pair of circular blades are driven in opposite directions.

2. Apparatus according to claim 1, characterised in that the left circular blade of the lower pair of circular blades in the direction of transport T has the same direction of rotation as the right circular blade of the upper pair of circular blades in the direction of transport T.

3. Apparatus according to claim 1, characterised in that the left circular blades of the two pairs of circular blades in the direction of transport T are driven in the direction opposite the direction of transport T, and the right circular blades of the two pairs of circular blades in the direction of transport T are driven in the direction of transport T, or vice versa.

4. Apparatus according to claim 1, characterised in that the circular blades of either the lower or upper pair of circular blades are driven at the same or different speeds.

5. Apparatus according to claim 1, characterised in that the lower pair of circular blades are driven at the same or a different speed to the upper pair of circular blades.

6. Apparatus according to claim 1, characterised in that the circular blades of the lower pair of circular blades are arranged at an angle to each other, such that the distance between the circular blades is shorter on the side facing towards the fish than on the side facing away from the fish.

7. Apparatus according to claim 1, characterised in that the circular blades of the upper pair of circular blades are arranged at an angle to each other, such that the distance between the circular blades is shorter on the side facing towards the fish than on the side facing away from the fish.

* * * * *